US006581378B1

United States Patent
Lebrun

(10) Patent No.: US 6,581,378 B1
(45) Date of Patent: Jun. 24, 2003

(54) VALVE DEVICE FOR HYDRAULIC ENGINE FOR DRIVING A LARGE FLYWHEEL MASS

(75) Inventor: Jean-Pierre Lebrun, Monceaux (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/743,661

(22) PCT Filed: Jul. 21, 1999

(86) PCT No.: PCT/FR99/01783

§ 371 (c)(1),
(2), (4) Date: Jan. 12, 2001

(87) PCT Pub. No.: WO00/05520

PCT Pub. Date: Feb. 3, 2000

(30) Foreign Application Priority Data

Jul. 22, 1998 (FR) .......................................... 98 09354

(51) Int. Cl.[7] .............................................. F16D 31/02
(52) U.S. Cl. .............................. 60/394; 60/460; 60/464; 91/38
(58) Field of Search .......................... 60/394, 460, 464, 60/468, 469, 493; 91/38

(56) References Cited

U.S. PATENT DOCUMENTS 3,636,708 A * 1/1972 Karman et al. ............... 60/464
3,925,987 A * 12/1975 Faisandier ................... 60/464
4,369,625 A * 1/1983 Izumi et al. .................. 60/394
4,520,625 A 6/1985 Sato et al.
5,197,283 A * 3/1993 Kagiwada et al. ............ 60/464

FOREIGN PATENT DOCUMENTS

| DE | 2218472 | * 10/1973 | .................. 60/464 |
| DE | 3330849 | 8/1982 | |
| EP | 0457913 | 11/1991 | |
| GB | 2112910 | * 7/1983 | .................. 60/464 |
| JP | 57163703 | 8/1982 | |
| JP | 62033945 | 2/1987 | |

* cited by examiner

Primary Examiner—F. Daniel Lopez
(74) Attorney, Agent, or Firm—Ladas & Parry

(57) ABSTRACT

A valve device (10) for at least one hydraulic motor suitable for driving a mass of large inertia. The device includes first and second ducts (12, 14) serving to be connected to respective ones of the two main ducts (feed or discharge) of the motor, and an auxiliary duct (15) connected, for example, to a booster duct. The device can have two configurations, depending on which of the main ducts has the higher pressure, in which configurations the main duct at high pressure is isolated, while the main duct at low pressure is connected to the auxiliary duct. The device includes time delay means (36, 46, 38, 48) suitable for limiting the speed of transition between one and the other of the first and second configurations when the difference between the pressures in the first and second main ducts (12, 14) changes sign.

16 Claims, 3 Drawing Sheets

VALVE DEVICE FOR HYDRAULIC ENGINE FOR DRIVING A LARGE FLYWHEEL MASS

The present invention relates to a valve device for at least one hydraulic motor suitable for driving a mass of large inertia, the motor being designed to be connected to a fluid circuit which includes two main ducts, namely a fluid feed duct and a fluid discharge duct, which ducts are suitable for being closed off when the motor is not operating, and an auxiliary duct in which the fluid pressure is lower than the feed pressure of the motor.

The mass that the motor serves to drive is referred to below as the "driven mass".

The motor to which the valve device applies serves, for example, to rotate a turret on plant such as a hydraulic excavator, or to move in translation plant having tracks or tires of large mass.

It may be a hydraulic motor of the "fast motor" type (1000 to 2000 revolutions per minute (r.p.m.)) driving gearing, or a "slow motor" (whose rotary speed is about 100 r.p.m., for example), e.g. of the type having radial pistons.

In operation, a flow of fluid is maintained through the motor, the main ducts being connected to main orifices of the motor (serving for feed and for discharge), so that one of the main ducts is put under pressure so as to act as feed duct, while the other of the ducts is at a relatively lower pressure and is connected to fluid removal means so as to act as discharge duct.

Starting from a situation in which the motor is operating at a given drive speed, the motor is stopped by performing a deceleration stage, and then by closing off the feed and discharge ducts. During the deceleration stage, the pressure in the feed duct becomes low pressure, while the pressure in the discharge duct becomes high pressure. Finally, on closing off the main ducts of the motor, i.e. on isolating the motor, the fluid situated in the discharge duct is at a pressure that is higher than the pressure of the fluid situated in the feed duct. This phenomenon is further reinforced by the fact that, due to its large inertia, the driven mass tends to continue its initial movement.

On flat terrain, the system reaches equilibrium only when the pressures in the feed and discharge ducts are substantially equal. On sloping terrain, or when the driven mass is leaning, the system reaches equilibrium only when the difference between the pressures in the feed and discharge ducts reaches a given value (positive or negative) that makes it possible to compensate for the slope in order to hold the mass stationary.

In any event, in order for the motor and the driven mass to be actually stopped in a stable position, it is necessary for the pressure difference between the feed and discharge ducts to reach a given value, be it zero, positive, or negative.

It is indicated above that, on closing off the feed and discharge ducts, the discharge duct is at high pressure that is further increased by the inertia of the driven mass. This high pressure tends to push back the driven mass in a return movement in the opposite direction, thereby transferring to the feed duct (which is closed off) the high pressure of the discharge duct (which is also closed off).

In addition, the hydraulic fluid is slightly compressible. As a result, after the motor has been isolated, the inertia mass continues to move until the pressure in the discharge duct reaches a maximum value corresponding to the fluid present in said discharge duct being compressed. The return movement of the mass causes the pressure in the feed duct to increase until the fluid present in said feed duct is brought to a compression pressure that is substantially equal to the maximum pressure that prevailed in the discharge duct just before the return stage began.

Naturally, the return stage is followed by another movement stage in the initial direction, during which expansion takes place in the feed duct and compression takes place in the discharge duct.

Thus, after closing off the feed and discharge ducts, an oscillating movement is imparted to the driven mass, the frequency of oscillation for turrets of plant such as hydraulic excavators being about 1 Hz. Although the oscillating movement is of relatively low amplitude, and is finally braked naturally due to friction phenomena, it is clearly extremely inconvenient, in particular when the mass driven by the motor is to be placed in a very precise position by stopping the motor without mechanical braking.

Paradoxically, the oscillating motion phenomenon used to be less of a problem when the drive was provided by means of low-performance motors in which the relatively large leaks limited the compression in the feed and discharge ducts. Motors have gradually been perfected, in particular to improve efficiency, to reduce the duration of the acceleration stage, and to facilitate handling in difficult conditions, e.g. when leaning.

To limit the oscillations, i.e. to reduce their amplitude and finally to stop them, it is known that a damping system can be used, consisting in creating leaks between the feed and the discharge ducts, which leaks feed a transfer volume. After isolating the motor, it is possible to compensate, at least partially, for the pressure difference between the feed and discharge ducts by using the fluid available in the transfer volume.

Another system consists in allowing continuous leaks to take place between the feed and discharge ducts of the motor.

Those systems are not fully satisfactory insofar as they result in a reduction in the efficiency of the motor, in contradiction with the efforts that have been made to increase efficiency, and insofar as they make it almost impossible to position the driven mass accurately on stopping the motor. For example, when the motor serves to drive the turret of a hydraulic excavator, the turret actually stops with an angular offset relative to the target angular position in which the motor is to be isolated, the angular offset corresponding to the amount of fluid that is available in the transfer volume for being put into circulation.

EP-A-0 457 913 discloses a device seeking to prevent cavitation phenomena and to limit or reduce shocks when the motor driving a mass of large inertia is stopped.

The device comprises a valve which includes first and second main ducts serving to be connected to respective ones of the two main ducts of the fluid circuit, and an auxiliary duct serving to be connected to the auxiliary duct of said circuit, the device being able to have a first configuration in which, with the fluid pressure in the first main duct being greater than the fluid pressure in the second main duct, said second main duct is connected to the auxiliary duct, while the first main duct is isolated from the second main duct and from the auxiliary duct, and a second configuration in which, with the fluid pressure in the second main duct being greater than the fluid pressure in the first main duct, said first main duct is connected to the auxiliary duct while the second main duct is isolated from the first main duct and from the auxiliary duct.

The valve enables the main duct, which is at a low pressure when the motor is stopped, to be connected to the auxiliary duct, thereby preventing cavitation in said main duct. In other words, the valve serves only to select the duct which is at low pressure and to connect it to a booster pressure.

The device does not however prevent almost unbraked oscillations from occuring after the motor has been stopped. As a function of said oscillations, the valve passes alternately from its first configuration to its second configuration without rapidly limiting the pressure difference between the two main ducts.

An object of the invention is to remedy the above-mentioned drawbacks by providing a device that is simple and reliable, and that makes it possible to brake and to reduce to zero very rapidly the oscillations of the system after isolating the motor, regardless of the conditions under which the mass is being driven, in particular regardless of whether it is being driven on sloping or banking terrain, or on flat terrain.

This object is achieved by the fact that the valve device includes time delay means suitable for limiting the speed of transition between one and the other of the first and second configurations when the difference between the pressures in the first and second main ducts changes sign.

To explain how the device operates, it is considered, for example, that the first main duct of the device is connected to the discharge duct, and that the second main duct is connected to the feed duct.

As indicated above, on decelerating and then stopping the motor (closing off the main ducts), the fluid pressure in the discharge duct is greater than the fluid pressure in the feed duct. Therefore, during the deceleration stage and until the motor stops, the valve device of the invention remains in its first configuration, the feed duct being brought to the pressure of the auxiliary duct.

Because of its large inertia, the driven mass continues its initial movement until the pressure in the discharge duct reaches a maximum value (compression). Starting from this situation, the driven mass begins a return movement during which the difference between the pressures in the discharge and feed ducts decreases until it is substantially zero, and it then changes sign.

When the pressure difference reaches zero, the mass continues its movement under the effect of its inertia, which tends to cause the pressure in the feed duct to increase by compression, and to cause the pressure in the. discharge duct to decrease.

When the pressure difference changes sign, the device is urged towards its second configuration in which the feed duct is isolated while the discharge duct is brought to the pressure of the auxiliary duct.

If the time delay means were not provided, the device would go from its first configuration to its second configuration too quickly, and the feed duct, as isolated as soon as the pressure difference between the feed and discharge ducts changes sign, would undergo a rapid and/or strong increase in pressure by compression, due to the movement of the driven mass until the end of oscillation thereof, and then the movement of the mass, generated by the high pressure in the feed duct, would start again in the opposite direction, and so on, so that a regime of almost unbraked oscillations would be set up.

By the presence of the time delay means, it is guaranteed that, during a given "time delay" time, the device remains in its first configuration in spite of the change in sign of the pressure difference between the feed and discharge ducts. During the time delay time, the increase in the pressure in the feed duct is very limited, because the second main duct of the device (the main duct that is connected to the feed duct) remains in communication with the auxiliary duct.

Thus, at the end of the return movement of the driven mass, the pressure in the feed duct is, at the most, only very slightly greater than the pressure in the discharge duct, so that the driven mass is urged to undergo at the most one more movement in the opposite direction (in the "go" direction again) and of low amplitude, during which movement, when the pressure difference between the feed and discharge ducts changes sign again, the time delay means play their part once again by limiting the increase in pressure in the discharge duct. It is possible to determine the time delay means such that the pressures in the feed and discharge ducts are substantially equal as of the end of the return movement, so that the one more movement in the go direction does not occur.

Thus, by using the time delay means, the oscillations of the driven mass experience a very rapid decrease in their amplitude until the mass stops completely.

In a particularly advantageous embodiment, the device includes a moving member suitable for being urged between two end positions as a function of the difference between the fluid pressures prevailing in the first and second main ducts, and, in its first and second end positions, said moving member puts the second main duct or the first main duct as the case may be in communication with the auxiliary duct via a calibrated constriction passageway.

Thus, the valve device is formed simply, the two end positions of the moving member corresponding to the above-mentioned first and second configurations.

The presence of the calibrated constriction passageway causes head loss between the auxiliary duct and that one of the main ducts to which it is connected, the head loss making it possible to ensure that the pressure does actually increase in the main duct despite it being connected to the auxiliary duct. Thus, the pressure in said main duct can increase until it becomes greater than the pressure in the other main duct which, to begin with, was at a higher pressure, so that the change in sign of the pressure difference that causes the moving member to move towards its other end position can occur.

Advantageously, the moving member is suitable for taking up a third position referred to as the "intermediate position". In a first variant, the main ducts and the auxiliary duct are isolated from one another in the intermediate position, whereas, in a second variant, they are connected to one another in said intermediate position.

In a particularly advantageous embodiment, the moving member is formed by a slide mounted to slide in a bore to which the two main ducts are connected, a communication duct connected continuously to the auxiliary duct being connected to said bore, in a portion of said bore that extends between the connection zones in which the two main ducts are connected to the bore. The slide has means (e.g. an annular groove) for establishing communication selectively, which means establish a link between the second main duct and the communication duct when the slide is in its first end position, and establish a link between the first main duct and said communication duct when the slide is in its second end position, the fluid flowing in said links going through calibrated constriction means. The slide also has closure means (e.g. regions of its axial peripheral wall in which the groove does not extend) which isolate the first main duct from the communication duct when the slide is in its first end position, and which isolate the second main duct from the communication duct when the slide is in its second end position.

Advantageously, the slide is moved between its two end positions under the effect of an increase in the fluid pressure in a first control chamber or in a second control chamber, the first and second control chambers being connected continuously to respective ones of the first and second main ducts.

The time delay means advantageously comprise first and second damping chambers situated at respective ones of first and second ends of the slide, the first and second damping chambers being continuously in communication with the auxiliary duct via calibrated constriction means that are calibrated to hinder the flow of fluid at least in the direction in which the chambers are emptied.

The invention will be well understood and its advantages will appear more clearly on reading the following detailed description of embodiments shown by way of non-limiting example. The description is given with reference to the accompanying drawings, in which.

Figure 1:
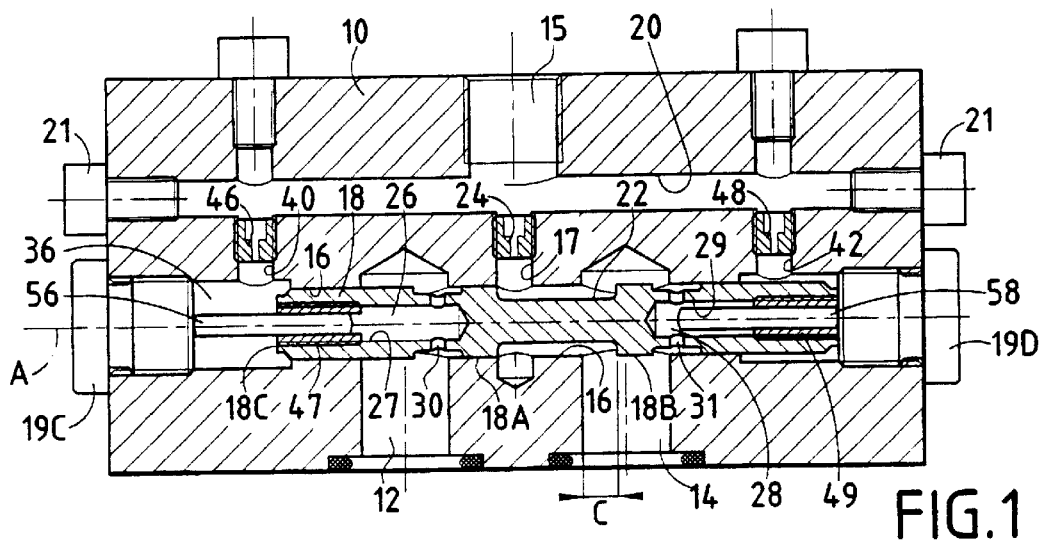
FIGS. 1 to 3 are axial section views of a first embodiment of a device of the invention in three different situations.
Figure 2:
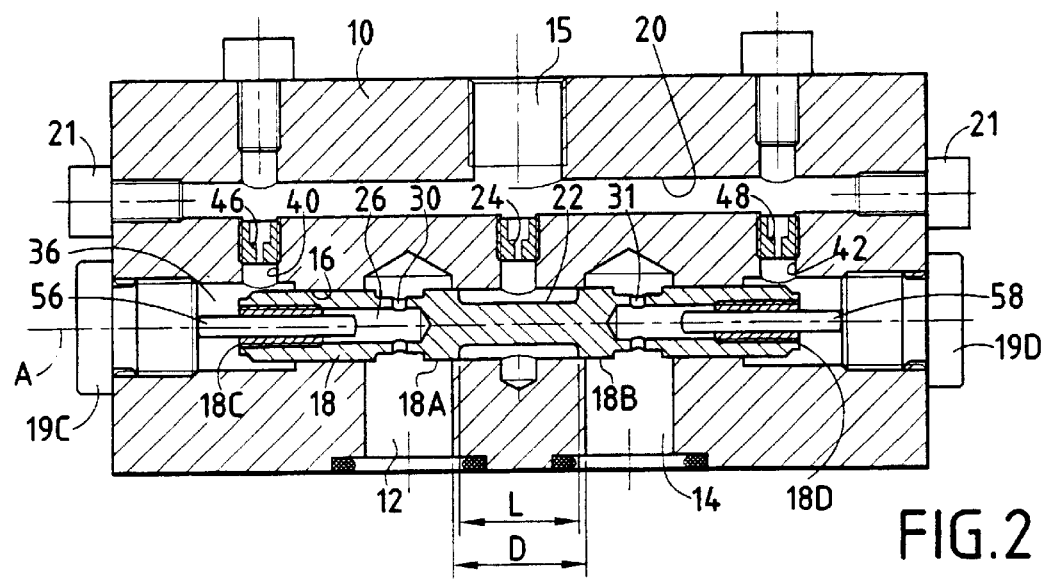
Figure 3:
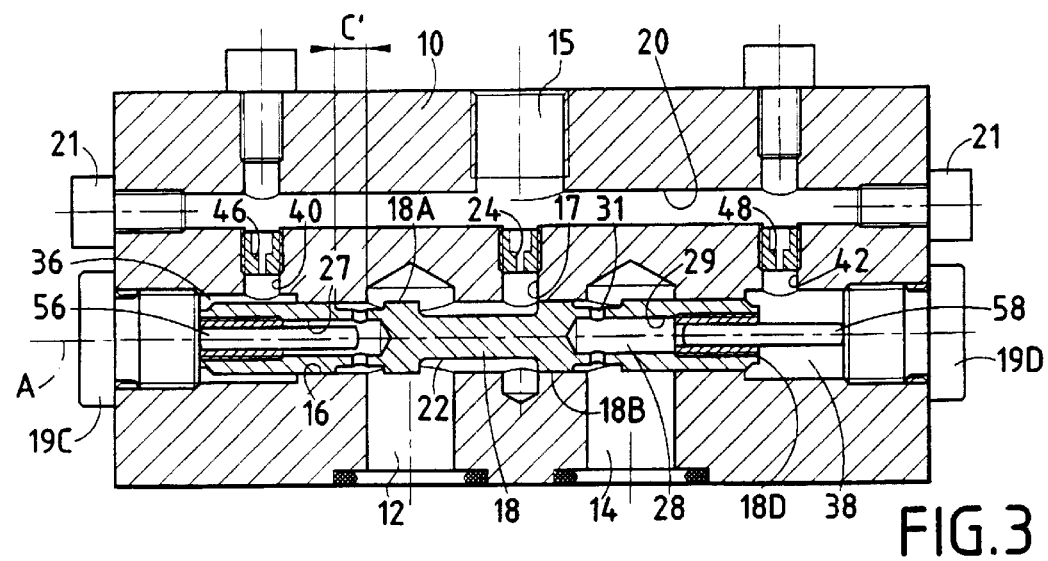

The device shown in FIGS. 1 to 3 includes a body 10 provided with two main ducts 12 and 14, serving to be connected respectively to the feed duct and to the discharge duct of a hydraulic motor, and with an auxiliary duct 15 serving to be connected to an auxiliary duct of the circuit, the fluid pressure in said auxiliary duct of the circuit being lower than the feed pressure of the motor.

A bore 16 is provided in the body 10, which bore has a middle portion extending between the connection zones in which the two main ducts 12 and 14 are connected to said bore, and two end portions extending at either end of said middle portion.

A slide 18 is mounted to slide in the bore 16. Throughout the description below, the axial direction is considered to be the direction of the axis A along which said slide moves.

The body 10 is further provided with a communication duct 17 which is connected continuously to the auxiliary duct 15 and to the bore 16. More precisely, an axial duct 20 passes through the body 10 and is closed at its two ends by stoppers 21. The ducts 15 and 17 extend transversely in alignment with each other and are formed by a hole drilled through the duct 20.

An annular groove 22 is provided in the axial periphery of the slide in a middle region of said slide.

When the slide is in a first end position, as shown in FIG. 1, the second main duct 14 is connected to the communication duct 17 via said groove 22. At the same time, the first main duct 12 is isolated from the ducts 14 and 15 by means of the wall of the bore co-operating with a portion 18A of the wall of the slide in the vicinity of the groove 22. It can be seen that a constriction piece 24 forming a calibrated constriction passageway is disposed in the communication duct 17. As a result, when the slide is in the first position, the coupling between the ducts 14 and 15 takes place via a calibrated constriction passageway formed by said piece 24.

The slide 18 may also take up a second end position, as shown in FIG. 3, in which position the groove 22 puts the first main duct 12 in communication with the communication duct 17 and thus with the auxiliary duct 15, while the second main duct 14 is isolated by the wall of the bore 16 co-operating with a portion 18B of the peripheral wall of the slide in the vicinity of the groove 22. In this position, the coupling between the main duct 12 and the auxiliary duct 15 also takes place via the calibrated constriction piece 24.

As indicated above, the presence of calibrated constriction means in the communication between duct 12 and duct 15 or between duct 14 and duct 15 generates head loss which, in spite of the communication, makes it possible to increase the pressure in the main duct in question.

FIG. 2 shows the slide in an intermediate position, in which it is midway along its stroke between its two end positions. It can be seen that, in this position, the groove 22 is isolated from the ducts 12 and 14. As a result, by means of the portions 18A and 18B of the periphery of the slide, the ducts 12 and 14 and the auxiliary duct 15 are isolated from one another when the slide is in this intermediate position. The length L of the groove 22 is shorter than the shortest distance D between the ducts 12 and 14, in their connection zones in which they are connected to the bore 16. As a result, when the pressure increases in duct 14, said duct 14 is isolated from duct 15 once the slide reaches its intermediate position after starting to move towards its second end position.

The valve device includes control means for placing it in its first configuration and in its second configuration. In the example shown, the control means comprise first and second control chambers 26 and 28, both of which are provided in the slide 18. The first chamber 26 is connected continuously to the first main duct 12 while it is isolated from the second main duct 14. The situation is the reverse for the second chamber 28, which is connected continuously to duct 14 while being isolated from duct 12. For example, the chambers 26 and 28 are provided in blind bores 27 and 29 which open out at respective ones of the first and second axial ends 18C and 18D of the slide. As explained below, the chambers 26 and 28 are however closed off at said axial ends.

Radially-drilled holes 30 and 31 extend respectively between the bores 27 and 29 and the axial periphery of the slide. Thus, the holes 30 establish continuous communication between the duct 12 and the chamber 26 while the holes 31 establish continuous communication between the duct 14 and the chamber 28. To facilitate establishing this continuous communication, the holes 30 and 31 are optionally provided in grooves.

The constriction means formed by means of the piece 24 may also be formed in some other manner, e.g. by dimensioning the groove 22 very accurately, or by using constrictions situated in the ducts 12 and 14 without preventing the chambers 26 and 28 from communicating with said ducts.

Starting with the slide in its first end position which is shown in FIG. 1 and in which the pressure in duct 14 is lower than the pressure in duct 12, it can be understood that, if the pressure in duct 14 increases until it is higher than the pressure in duct 12 (the pressure difference changes sign), then the pressure in chamber 28 naturally also becomes higher than the pressure in chamber 26, thereby causing the slide to move towards its second end position by going through its intermediate position.

In the example shown, the walls of the chambers 26 and 28 that are at the ends 18C and 18D of the slide are stationary, so that an increase in pressure in either of the chambers, which causes the slide to move, also causes an increase in the volume of the chamber in question.

The device also includes time delay means which serve to limit the speed at which the slide goes from one of its end positions to the other. In other words, the time delay means serve to delay or to hinder the movement of the slide, without preventing it. In the example shown, these time delay means comprise a first damping chamber 36 situated in the vicinity of the first end 18C of the slide, and a second damping chamber 38 situated in the vicinity of the second end 18D of the slide. More precisely, the bore 16 passes through the body 10 with the two ends of the bore being closed off by stoppers, respectively 19C at end 18C of the slide and 19D at end 18D.

Thus, the chamber 36 is provided between the stopper 19C, the wall of the bore 16, and the end 18C of the slide, while the chamber 38 is provided between the stopper 19D, the wall of the bore 16, and the end 18D of the slide.

The chambers 36 and 38 are continuously in communication with the auxiliary duct 15 via calibrated constriction means so as to hinder the flow of fluid at least in the chamber-emptying direction.

More precisely, the chambers 36 and 38 are connected to the axial duct 20 via transverse link ducts, respectively 40 and 42. A piece 46 forming a calibrated constriction is disposed in link duct 40, while an analogous piece 48 is disposed in link duct 42. Thus, the chambers 36 and 38 communicate with the duct 20 (and thus with the duct 15) via calibrated constriction passageways formed by the pieces 46 and 48.

Although the fluid is slightly compressible, it is necessary for the damping chamber 36 to be emptied so that, under the effect of the fluid pressure acting in the chamber 28, the slide is moved from its first end position (FIG. 1) to its second end position (FIG. 3). However, this emptying of the chamber 36 is hindered by the presence of the constriction 46, which slows down the movement of the slide.

Therefore, when the pressure in duct 14 becomes higher than the pressure in duct 12, duct 14 continues to be in communication with the auxiliary duct 15 for a time delay period that depends in particular on the dimensioning of the constriction 46, thereby slowing down and limiting the increase in the pressure in said duct 14.

By means of the constriction 48, the situation is analogous when the slide tends to move towards its first end position from its second end position.

Machining the body 10 is made simpler by using the same axial duct 20 for putting duct 17 and ducts 40 and 42 in communication with the auxiliary duct 15. However, it is possible to provide a first hole serving to put duct 17 in communication with duct 15, and a distinct second hole serving to put ducts 40 and 42 in communication. In which case, it is possible to use a single constriction piece only, disposed in said second hole.

Each of the first and second control chambers 26 and 28 has a working surface area against which the fluid pressure acts to cause the slide to move respectively towards its first position and towards its second position. Similarly, each of the damping chambers 36 and 38 has a working surface area against which the fluid pressure acts to hinder the reduction in volume of the chamber.

For each set comprising a control chamber (e.g. chamber 28) and the associated damping chamber (e.g. chamber 36) that it is necessary to empty in order to move the slide 18 in the direction resulting from an increase in pressure in the control chamber, the ratio between the working surface area of the control chamber and the working surface area of the damping chamber constitutes a parameter for controlling the speed of movement of the slide in the emptying direction of the damping chamber in question.

The through cross-sectional areas of the constrictions 46 and 48 and the ratios between the working surface areas of the control chambers and of the associated damping chambers may be determined by means of simulations so as to obtain the desired time delay in either of the directions in which the slide moves. Usually, an equal time delay is chosen for both directions.

It is indicated above that the chambers 26 and 28 are formed in blind bores that are closed off at the ends 18C of 18D of the slide. More precisely, the first control chamber 26 is separated from the first damping chamber 36 by a first cylindrical rod 56 of small cross-section which is disposed in the blind bore 27, and the second control chamber 28 is separated from the second damping chamber 38 by a second cylindrical rod 58 of small cross-section disposed in the bore 29.

The rods 56 and 58 are disposed in sleeves, respectively 47 and 49, in the bores 27 and 29. Sliding contact (made substantially fluid-tight by minimizing the operational clearance) is established between the rods and the sleeves, so that the rods 56 and 58 remain substantially stationary when the slide moves. The working surface area of the first control chamber 26 is determined by the surface area of the free end of the rod 56 that is situated in said first chamber, and the working surface area of the second control chamber 28 is determined by the surface area of the free end of the rod 58 that is situated in said second chamber.

The working surface area of the damping chamber 36 is a function of the cross-sectional area of the first end of the slide 18C, possibly minus the cross-sectional area of the rod 56, and the working surface area of the second damping chamber 38 is a function of the cross-sectional area of the end 18D of the slide, possibly minus the cross-sectional area of the rod 58.

Another parameter influencing the damping time is the "damping volume". The damping volume of the damping chamber 36 is the volume of said chamber that must be emptied in order to enable the slide 18 to move over the stroke C that it travels to go from its first position to its position in which, since the portion of wall 18B comes against the wall of the bore 16, the second main duct 14 is isolated from the auxiliary duct 15. Similarly, the damping volume of the chamber 38 is the volume that must be emptied in order to enable the slide 18 to move over the stroke C' that it travels to go from its second position to its position in which the first main duct 12 is isolated from the auxiliary conduct 15. In general, the same damping volumes are chosen for both chambers 36 and 38.

Advantageously, the cylindrical rods 56 and 58 are respectively mounted to move freely in the bores 27 and 29 (more precisely in the sleeves 47 and 49). This makes it easier to mount the rods by avoiding problems of concentricity between the rods and the bores.

Figure 4:
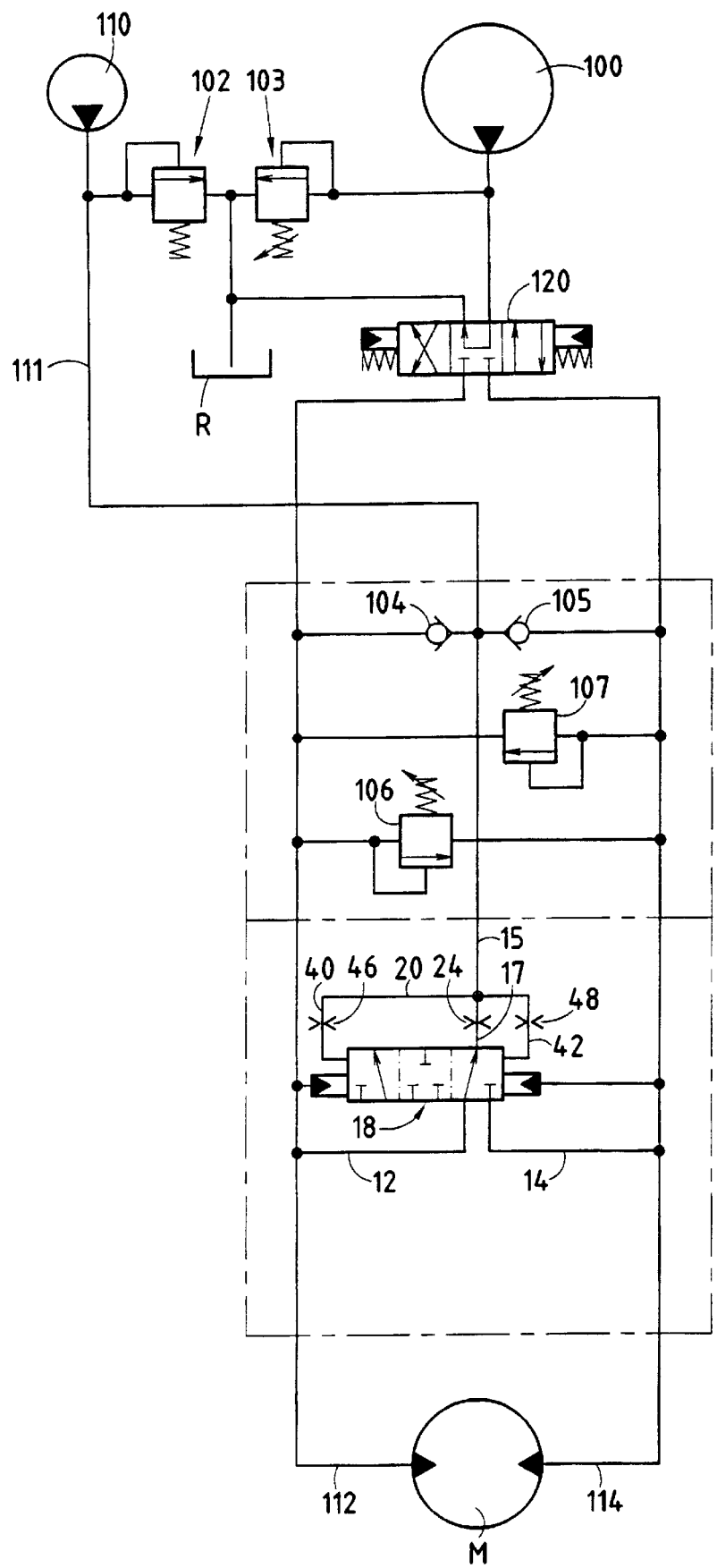
FIG. 4 shows a hydraulic circuit for feeding a hydraulic motor, which circuit includes a device as shown in FIGS. 1 to 3.

With reference to FIG. 4, a description follows of a hydraulic circuit that incorporates the device shown in FIGS. 1 to 3 and that is shown diagrammatically. The circuit is of the "open circuit" type insofar as the hydraulic pump 100 that serves to feed the motor M is a pump having a single operating direction, the fluid outlet being connected to a tank R at atmospheric pressure. The motor M includes main ducts 112 and 114 which, depending on the operating direction defined by a respective one of the end positions of a distribution valve 120, serves as feed or as discharge for the motor.

In a manner known per se, the circuit also includes a booster pump 110 and pressure relief valves 102 and 103. The booster pump 110 serves to guarantee that at least a given minimum pressure is provided in the ducts 112 and 114. In a manner known per se, the booster pump is connected to said ducts via a booster duct 111 and via non-return valves 104 and 105 associated with pressure relief valves 106 and 107.

FIG. 4 shows the situation in which the motor is isolated, in which position the valve 120 takes up an intermediate position that closes off the ducts 112 and 114, the fluid delivered by the pump going directly to the tank R. The booster pump 110 serves to guarantee at least a given minimum pressure in the ducts 112 and 114. It is connected to these ducts via non-return valves 104 and 105 associated with pressure relief valves 106 and 107.

The device of the invention is situated in the unit B1 shown in FIG. 4. The valve device is shown in standardized manner with the moving slide 18 being mounted to move between three positions. The main ducts 12 and 14 respectively connected to the main ducts 112 and 114 are indicated, as is the auxiliary duct 15 connected to the booster pump 110.

In FIG. 4, the slide is shown in its second end position, in which duct 14 is isolated from ducts 112 and 115 which are connected together. In other words, the main duct 114 of the motor is isolated from the ducts 112 and 115 which are connected together.

FIG. 4 also shows diagrammatically the duct 20, the communication duct 17, and the link ducts 40 and 42, with their constrictions 24, 46, and 48.

The entire unit B1 may be part of a hydraulic unit designed to be fixed to the casing of the hydraulic motor M. Together with the unit B2 which includes the non-return valves 104 and 105 and the pressure relief valves 106 and 107, the unit B1 may constitute a common hydraulic unit fixed (flanged-coupled) to the casing of the motor. The motor may be a motor having a single operating cubic capacity, or else it may have a plurality of operating cubic capacities, in which case the hydraulic unit including the unit B1 may also include the selection means for selecting the cubic capacity of the motor. Furthermore, the device of the invention that is shown is associated with a single motor M.

In particular, to drive an extremely heavy mass in translation, it is possible to make provision to use a group of a plurality of motors disposed in series or in parallel. In which case, the device may be associated with the entire set of the motors of the group, the first and second main ducts 12 and 14 being respectively connected to the feed and discharge lines of a motor of the group or of the group of motors.

The auxiliary duct 15 of the device is connected to the booster duct 111, fed by the booster pump 110. In other words, the above-mentioned auxiliary duct is a booster duct of the circuit, in which duct the fluid is maintained at a given pressure that is lower than the feed pressure.

Although the circuit shown in FIG. 4 is an open circuit, the valve device of the invention may also be integrated into a closed-type circuit, in which the pump has a high-pressure fluid outlet for feeding the feed duct, and a low-pressure fluid inlet connected to the discharge duct. The pump may be of fixed or variable cubic capacity. It may have two rotation directions for selectively feeding either one of the main ducts, or else it may have a single rotation direction, in which case a selector of the type of the selector 120 shown in FIG. 4 makes it possible to connect the feed or the discharge duct selectively to the outlet and inlet orifices of the pump.

When the motor is not operating, the booster pump serves to maintain a given "boost" pressure in all of the ducts of the circuit, and during operation of the motor, said booster pump serves to maintain the ducts connected to the outlet at the boost pressure. Thus, the boost pressure is low compared with the feed pressure of the motor.

Once the driven mass has been stabilized, the main feed and discharge ducts are normally at said boost pressure (to within a slight difference if the driven mass stops while it is leaning). Since the auxiliary duct of the valve device of the invention is connected to said booster duct, it is possible, depending on the configuration of the device, to place the feed and the discharge ducts at the boost pressure at which they will be once the motor has stopped completely (except when leaning).

In addition, a closed-type fluid circulation is thus established between the feed and the discharge ducts and the booster duct. Therefore, the oscillations of the driven mass are damped without consuming any fluid.

Conventionally, the boost pressure is approximately in the range 5 bars to 30 bars, depending on whether the circuit is of the open type or of the closed type. For example, for a hydraulic motor type operating up to pressures of 300 bars, the main ducts 12 and 14 are chosen to be about 12 mm in diameter, the constriction 24 is chosen to be about 1 mm in diameter, and the constrictions 46 and 48 are chosen to be about 0.3 mm in diameter. In the same example, the ratio between the working surface area of the control chambers and the working surface area of the damping chambers is about 1/10, while the damping volume (equal for both of the damping chambers) is about 0.5 cm$^3$.

The hydraulic motor may be a motor having radial pistons, whose main orifices are disposed on the casing portion that surrounds the internal fluid distributor of the motor, which casing portion may be referred to as the "distribution cover". The hydraulic unit B1 or even the entire set of units B1 and B2 of FIG. 4 may then be integrated in the distribution cover.

If the motor has a plurality of operating cubic capacities, it may have a plurality of main fluid feed or discharge orifices (e.g. for a given rotation direction of the motor, a first orifice which serves for feeding, a second orifice which serves for discharge, and a third orifice which serves both for discharge and for feeding, depending on whether the motor is operating at a large cubic capacity or at a small cubic capacity). In which case, the valve device of the invention may be interposed between the first orifice and the second orifice mentioned above.

Figure 5:
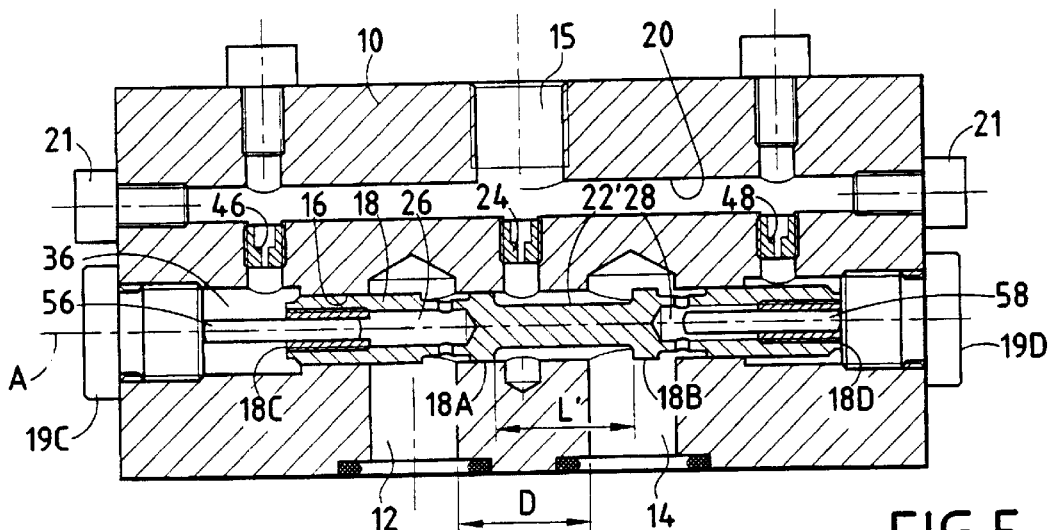
FIGS. 5 to 7 show a second embodiment of a device of the invention in three different situations.
Figure 6:
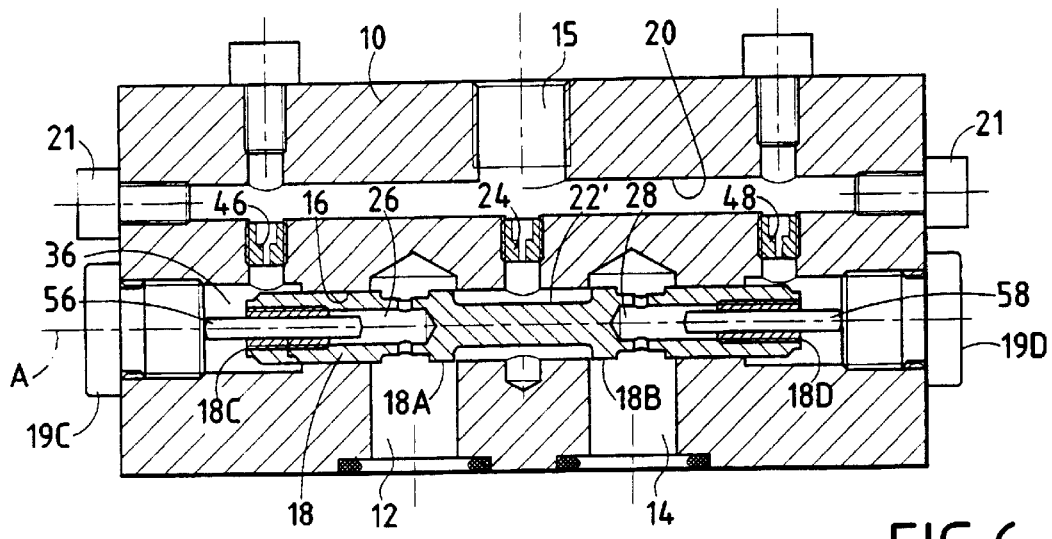
Figure 7:
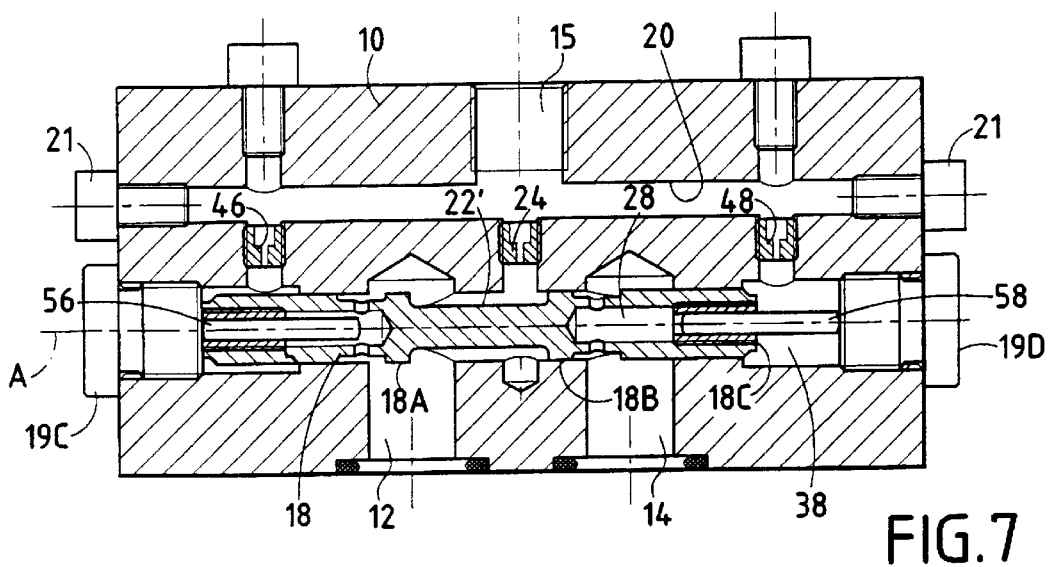

FIGS. 5 to 7 show a variant of the device shown in FIGS. 1 to 3, which variant differs therefrom only by the shape of the groove in the slide, so that all of the elements of the device shown in FIGS. 5 to 7 except for said groove are given the same references as in FIGS. 1 to 3.

Thus, in FIGS. 5 to 7, the groove of the slide is designated by reference 22'. In this variant, its length L is longer than the shortest distance D between the main ducts 12 and 14. Therefore, when the slide is in the first and second end positions, as shown in FIGS. 5 and 7, the situation is the same respectively as in FIG. 1 and as in FIG. 3.

In contrast, when the slide is in the intermediate position, shown in FIG. 6, the groove is disposed facing both the connection zone in which the communication duct 17 is connected to the bore 16, and also the connection zones in which the first and second main ducts 12 and 14 are connected to said bore.

In other words, when the slide is in the intermediate position, the groove 22' establishes communication between the first main duct 12, the second main duct 14, and the auxiliary duct 15. Naturally, it is important for this intermediate situation to be only temporary, and for the length L to be only slightly longer than the distance D, so that head loss is caused that still makes it possible to increase the pressure in duct 12 or in duct 14.

This configuration of the groove is suitable for accelerating the process of damping the oscillations. If, starting from the situation shown in FIG. 5, the pressure increases in the duct 14 under the effect of the driven mass rebounding due to its inertia, then, as explained above, as a result of the time delay means, the slide does not move instantly towards its FIG. 7 position, but rather it makes it possible to "remove" a portion of the pressure rising in the duct 14 via the duct 15.

This removal phenomenon is further reinforced when, in the intermediate situation shown in FIG. 6, the fluid can go directly from the duct 14 to the duct 12 by means of the groove 22' (in other words, the constriction 24 is then by-passed), which balances the pressures between the ducts 12 and 14 more rapidly than in FIG. 2.

The device described above with reference to FIGS. 5 to 7 may be disposed in place of the device shown in FIGS. 1 to 3, in the unit B1 of the circuit of FIG. 4, so as to operate in the same way. Naturally, in either case, the circuit may be "open", as shown in FIG. 4, or "closed", depending on the type of pump that is used.

On a sloping or banking terrain, after it has stopped completely, the driven mass is naturally subjected to stress (gravity) which must be compensated by the motor as stopped so as to hold the mass in position. Therefore, one of the main ducts of the motor (thus one of the main ducts of the device of the invention) is under slight extra pressure, and the slide 18 then takes up its corresponding end position.

What is claimed is:

1. A valve device for at least one hydraulic motor suitable for driving a mass of large inertia, the motor being designed to be connected to a fluid circuit which includes two main ducts, namely a fluid feed duct adapted to be connected to a hydraulic pump and a fluid discharge duct, which ducts are suitable for being closed off when the motor is not operating, and an auxiliary duct adapted to be connected to a booster pump which delivers fluid at a lower pressure than a pressure of said fluid delivered by said hydraulic pump, the device including first and second main conduits serving to be connected to respective ones of the two main ducts of the fluid circuit, and an auxiliary conduit serving to be connected to the auxiliary duct of said circuit, the device including a moving member suitable for being urged between two end positions as a function of the difference between the fluid pressures prevailing in the first and second main ducts, wherein in a first end position of said moving member, with a fluid pressure in the first main duct being greater than a fluid pressure in the second main duct, said moving member puts said second main conduit in communication with said auxiliary conduit via a calibrated constriction passageway, while the first main conduit is isolated from said second main conduit and from said auxiliary conduit, and in a second end position, with a fluid pressure in the second main duct being greater than a fluid pressure in the first main duct, said moving member puts the first main conduit in communication with said auxiliary conduit via said calibrated constriction passageway, while said second main conduit is isolated from said first main conduit and from said auxiliary conduit, said device further including time delay means suitable for limiting the speed of transition between one and the other of said first and second configurations when a difference between pressures in the first and second main ducts changes sign, said time delay means comprising first and second damping chambers which are continuously in communication with said auxiliary conduit via calibrated constriction means that are calibrated to hinder the flow of fluid at least in the direction in which the chambers are emptied.

2. A device as claimed in claim 1, wherein the moving member is suitable for taking up a third position referred to as the "intermediate position", in which the main conduits and the auxiliary conduit are isolated from one another.

3. A device as claimed in claim 1, wherein the moving member is suitable for taking up a third position referred to as the "intermediate position", in which the main conduits and the auxiliary conduit are connected to one another.

4. A device as claimed in claim 1, wherein the moving member is formed by a slide mounted to slide in a bore to which the two main conduits are connected, a communication conduit connected continuously to the auxiliary conduit being connected to said bore, in a portion of said bore that extends between the connection zones in which the two main conduits are connected to the bore, said slide having firstly means for establishing communication selectively, which means establish a link between the second main conduit and the communication conduit when the slide is in its first end position, and establish a link between the first main conduit and said communication conduit when the slide is in its second end position, the fluid flowing in said links going through calibrated constriction passageway, said slide having secondly closure means which isolate the first main conduit from the communication conduit when the slide is in its first end position, and which isolate the second main conduit from the communication conduit when the slide is in its second end position.

5. A device as claimed in claim 4, wherein said calibrated constriction passageway is provided in the communication conduit.

6. A device as claimed in claim 4, wherein the slide has an annular groove which is disposed continuously facing a connection zone in which the communication conduit is connected to the bore and which, when the slide is in the first end position, is disposed facing a connection zone in which the second main conduit is connected to the bore while being isolated from a connection zone in which the first main conduit is connected to the bore, and, when the slide is in the second end position, the annular groove is disposed facing the connection zone in which the first main conduit is connected to the bore while being isolated from the connection zone in which the second main conduit is connected to the bore.

7. A device as claimed in claim 6, wherein the annular groove in the slide has a length such that an intermediate position of the slide exists in which said groove is disposed facing the connection zone in which the communication conduit is connected to the bore while being isolated from the connection zones in which the first and second main conduits are connected to the bore.

8. A device as claimed in claim 6, wherein the annular groove in the slide has a length such that an intermediate position of the slide exists in which said groove is disposed facing both the connection zone in which the communication conduit is connected to the bore and also the connection zones in which the first and second main conduits are connected to the bore.

9. A device as claimed in claim 4, including a first control chamber provided in the slide and connected continuously to the first main conduit while being isolated from the second main conduit, and a second control chamber also provided in the slide and connected continuously to the second main conduit while being isolated from the first main conduit, an increase in a fluid pressure in the first control chamber relative to a fluid pressure in the second control chamber, due to the difference between the fluid pressures in the first and second main ducts, being capable of causing the slide to move towards its first end position, and an increase in a fluid pressure in the second control chamber relative to a fluid pressure in the first control chamber, due to the difference between the fluid pressure in the first and second main ducts, being capable of causing the slide to move towards its second end position.

10. A device as claimed in claim 9, wherein said first and second damping chambers are situated at respective ones of first and second ends of the slide.

11. A device as claimed in claim 10, wherein the first control chamber is formed in a first blind bore opening out at the first end of the slide, and is separated from the first damping chamber by a first cylindrical rod disposed in said bore, and wherein the second control chamber is formed in a second blind bore opening out at the second end of the slide, and is separated from the second damping chamber by a second cylindrical rod disposed in said bore.

12. A device as claimed in claim 11, wherein the first and second cylindrical rods are mounted to move freely in respective ones of the first and second blind bores.

13. A device as claimed in claim 4, wherein said first and second damping chambers are situated at respective ones of first and second ends of the slide.

14. A fluid circuit comprising a hydraulic pump, a hydraulic motor suitable for driving a mass of large inertia, two main ducts connected to said motor, namely a fluid feed duct fed by said pump and a fluid discharge duct, means for closing off said main ducts by isolating said main ducts from said pump when the motor is not operating, an auxiliary duct containing fluid at a pressure lower than the pressure of fluid contained in said fluid feed duct and a valve device comprising a first and a second conduit respectively connected to respective ones of said two main ducts of the fluid circuit, and an auxiliary conduit connected to said auxiliary duct of the fluid circuit, the valve device being able to have a first configuration in which, with a fluid pressure in the first main duct being greater than the fluid pressure in the second main duct, said second main conduit is connected to the auxiliary conduit, while the first main conduit is isolated from the second main conduit and from the auxiliary conduit, and a second configuration in which, with a fluid pressure in the second main duct being greater than the fluid pressure in the first main duct, said first main conduit is connected to the auxiliary conduit while the second main conduit is isolated from the first main conduit and from the auxiliary conduit, the device further including time delay means, comprising first and second dampening chambers which are continuously in communication with said auxillary conduit via calibrated constriction means, suitable for limiting the speed of transition between one and the other of the first and second configurations when said main ducts are isolated by said means for closing off, and when a difference between pressures in the first and second main ducts changes sign.

15. A circuit as claimed in claim 14, wherein the valve device includes a moving member suitable for being urged between two end positions as a function of the difference between the fluid pressures prevailing in the first and second main ducts, wherein in its first and second end position, said moving member puts the second main conduit or the first main conduit as the case may be in communication with the auxiliary conduit via a calibrated constriction passageway.

16. A circuit as claimed in claim 14, wherein the auxiliary duct is a booster duct for boosting the fluid circuit, in which duct the fluid is maintained at a given pressure that is lower than the pressure delivered by said hydraulic pump.

* * * * *